Jan. 29, 1957 J. T. MOORE 2,779,120
ARTIFICIAL LURE AND HOOK RETRIEVER
Filed July 6, 1954

INVENTOR
JAMES T. MOORE
BY
ATTORNEY

United States Patent Office 2,779,120
Patented Jan. 29, 1957

2,779,120

ARTIFICIAL LURE AND HOOK RETRIEVER

James T. Moore, Dallas, Tex.

Application July 6, 1954, Serial No. 441,260

2 Claims. (Cl. 43—17.2)

This invention relates to an artificial lure and hook retriever, and particularly relates to a device for retrieving fishing hooks and lures which have snagged on debris or other foreign objects below the water at relatively great depths.

More specifically, the invention comprises a weight which can be dropped along a fishing line so as to impinge against a snagged hook. This impinging action knocks the hook loose from the entangling obstruction. The weight is under control at all times and when its purpose is accomplished, it can easily be released from the fishing line.

The use of fishing hook retrievers of this general nature is not new, there having been many previous attempts to provide a retriever which can adequately accomplish the purpose. However, all such previous devices have either been too complicated and expensive to manufacture or have not been capable of efficiently accomplishing their purpose.

It is, therefore, one object of this invention to provide a fishing lure and hook retriever which is easily connected to the fishing line to accomplish its purpose, and which is, thereafter, easily disconnected from the fishing line after its purpose has been accomplished.

Another object of this invention is to provide a fishing lure and hook retriever which cannot, under ordinary circumstances, be accidentally disconnected from the fishing line while it is in the water.

Another object of this invention is to provide a fishing lure and hook retriever which is of very simple construction and which can be easily manipulated.

Other objects of this invention are to provide an improved fishing lure and hook retriever that is easily and economically produced, which is sturdy in construction, and which is highly effective in operation.

With the above and related objects in view, this invention consists in the details of construction and combination of parts, as will be more fully understood from the following description, when read in conjunction with the accompanying drawing in which.

Figure 2:
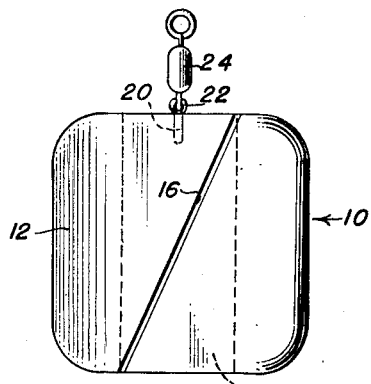
Fig. 2 is a side elevational view of the device shown in Fig. 1.
Figure 3:
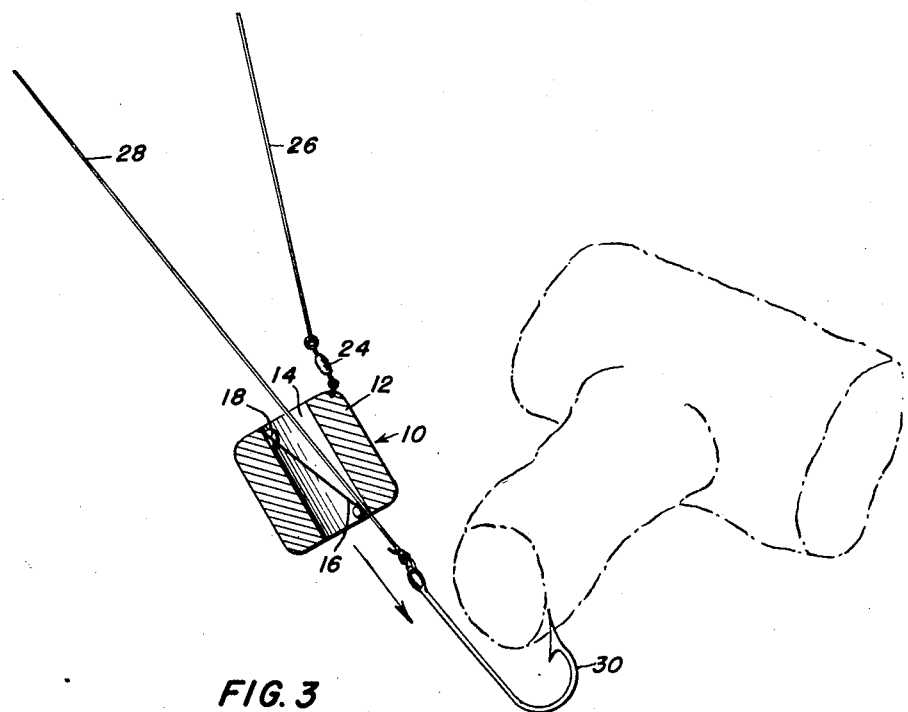
Fig. 3 is a view showing the retriever associated with a fishing line and in the process of freeing a hook, the retriever being shown in cross-section and the remaining structure in elevation.

Referring now in greater detail to the drawing wherein similar reference characters refer to similar parts, the retriever embodying the invention is generally designated 10. The retriever 10 comprises a generally cylindrical weight 12, made of lead or the like, which is provided with a central, longitudinally extending bore 14. A slot 16 extends diagonally around the weight 12 in a longitudinal direction, the slot being inclined from a position corresponding to the plane of one corner of the bore to a position corresponding to the plane of the diagonally opposite corner of the bore, as best illustrated in Fig. 2.

Figure 1:
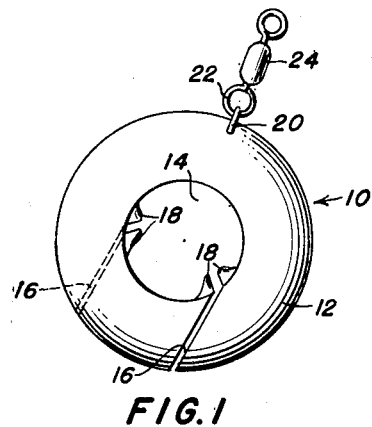
Fig. 1 is a top plan view of a device embodying the invention.

Within the confines of the bore, at the upper and lower ends thereof adjacent the slot 16, and at either side of the slot, are provided drops of solder 18. These drops of solder are illustrated in Fig. 1.

An eyelet 20 extends from one end of the weight 12 and is connected to a second eyelet 22 which is part of a swivel connection 24. A control line 26 is connected to the swivel 24 for the purpose of manually controlling and actuating the weight from a remote position.

In operation, the weight is attached to the fishing line 28 by inserting the line laterally through the slot 16 into the bore 14. The weight is then manipulated so that the fishing line is moved to one side of one of the drops of solder. The weight is, thereby, slidably connected to the fishing line. The slot is then squeezed shut between the thumb and forefinger.

When the hook 30 is snagged, the weight is allowed to drop down the fishing line 28 until it strikes the hook. The control line 26 is, thereafter, used to lift the weight and then loosened to allow the weight to drop again. This process is repeated until the hook had been knocked loose. The line is, meanwhile, prevented from slipping into the slot 16 because of the diagonal arrangement of the slot which is off-set from the position of the fishing line and because of the drops of solder which act as stops to prevent movement of the line toward the slot.

Although the invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fishhook retriever comprising a cylindrical lead weight, said weight being provided with an axial bore extending therethrough, said weight also being provided with a slot extending around a portion of the periphery of said weight and intersecting said bore, said slot being inclined from a plane corresponding to a position at one end of said bore to a plane corresponding to a diagonally opposite position at the opposite end of said bore, said inclined slot being readily closable after said weight has been applied about a fishing line to hold said weight against accidental separation from the fishing line, a stop being provided at each side of said slot at each of the said opposite ends of said bore.

2. A fishhook retriever comprising a generally cylindrical weight of pliable, inelastic metal, a bore extending longitudinally through the center thereof, said weight being provided with a slot extending around a portion of the periphery of said weight in a substantially longitudinal direction, said slot intersecting said bore at all positions of said slot and said slot being inclined relative to said weight and to said bore, said inclined slot being readily closable after said weight has been applied about a fishing line to hold said weight against accidental separation from the fishing line, stops being provided at each side of said slot adjacent each end of said bore.

References Cited in the file of this patent

UNITED STATES PATENTS

| 720,136 | Hailliran | Feb. 10, 1903 |
|---|---|---|
| 1,851,370 | Munger | Mar. 29, 1932 |
| 2,097,536 | Shirk | Nov. 2, 1937 |
| 2,534,790 | Moore | Dec. 19, 1950 |
| 2,634,539 | Brown et al. | Apr. 14, 1953 |
| 2,676,430 | Richard | Apr. 27, 1954 |